US010349231B2

United States Patent
Sato et al.

(10) Patent No.: US 10,349,231 B2
(45) Date of Patent: Jul. 9, 2019

(54) SYSTEM, ELECTRONIC DEVICE, AND METHOD

(71) Applicant: SONY CORPORATION, Tokyo (JP)

(72) Inventors: Masanori Sato, Tokyo (JP); Tomoya Yamaura, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/122,713

(22) PCT Filed: Mar. 27, 2015

(86) PCT No.: PCT/JP2015/001788
§ 371 (c)(1),
(2) Date: Aug. 31, 2016

(87) PCT Pub. No.: WO2015/162857
PCT Pub. Date: Oct. 29, 2015

(65) Prior Publication Data
US 2017/0070866 A1 Mar. 9, 2017

(30) Foreign Application Priority Data
Apr. 24, 2014 (JP) ................. 2014-090257

(51) Int. Cl.
H04W 4/08 (2009.01)
H04W 76/10 (2018.01)
(Continued)

(52) U.S. Cl.
CPC ............ *H04W 4/08* (2013.01); *H04B 17/318* (2015.01); *H04L 12/189* (2013.01);
(Continued)

(58) Field of Classification Search
CPC ....... H04W 4/08; H04W 76/02; H04W 4/023; H04W 24/02; H04B 17/318; H04L 12/1872; H04L 12/189; H04L 12/1868
See application file for complete search history.

(56) References Cited

U.S. PATENT DOCUMENTS 6,567,381 B1 * 5/2003 Jeon ...................... H04W 24/06
370/252
8,000,684 B1 * 8/2011 Bhan ..................... H04W 52/38
455/412.2
(Continued)

FOREIGN PATENT DOCUMENTS

JP 2003-258813 A 9/2003
JP 2003-332977 A 11/2003
(Continued)

OTHER PUBLICATIONS

International Search Report dated Jun. 24, 2015 in PCT/JP2015/001788 filed Mar. 27, 2015.
(Continued)

*Primary Examiner* — Jay P Patel
(74) *Attorney, Agent, or Firm* — Xsensus LLP

(57) ABSTRACT

There is provided a communication control system that receives monitoring information from a plurality of wireless terminals, the monitoring information indicating reception powers at each of the plurality of wireless terminals in a case that packets transmitted from other of the plurality of wireless terminals are received at each of the plurality of wireless terminals; and determines a representative wireless terminal from the plurality of wireless terminals based on the collected monitoring information.

11 Claims, 12 Drawing Sheets

(51) Int. Cl.
  *H04L 12/18* (2006.01)
  *H04B 17/318* (2015.01)
  *H04W 4/02* (2018.01)
  *H04W 24/02* (2009.01)
(52) U.S. Cl.
  CPC ...... *H04L 12/1868* (2013.01); *H04L 12/1872* (2013.01); *H04W 4/023* (2013.01); *H04W 76/10* (2018.02); *H04W 24/02* (2013.01)

(56) References Cited

U.S. PATENT DOCUMENTS

| | | | |
|---|---|---|---|
| 9,794,894 B2* | 10/2017 | Feuersaenger | H04L 5/0007 |
| 2003/0236082 A1 | 12/2003 | Aoki et al. | |
| 2008/0146207 A1 | 6/2008 | Razdan | |
| 2009/0067335 A1* | 3/2009 | Pelletier | H04L 41/5025 |
| | | | 370/238 |
| 2009/0227251 A1* | 9/2009 | Lei | H04J 11/0069 |
| | | | 455/425 |
| 2011/0261776 A1* | 10/2011 | Ahn | H04L 5/0007 |
| | | | 370/329 |
| 2012/0028630 A1* | 2/2012 | Yamamoto | H04W 52/242 |
| | | | 455/422.1 |
| 2012/0224552 A1* | 9/2012 | Feuersanger | H04L 5/0007 |
| | | | 370/329 |
| 2015/0046679 A1* | 2/2015 | Gathala | G06F 8/443 |
| | | | 712/30 |
| 2015/0296526 A1* | 10/2015 | Behravan | H04W 16/14 |
| | | | 370/329 |
| 2016/0142898 A1* | 5/2016 | Poitau | H04W 76/14 |
| | | | 370/329 |
| 2018/0007642 A1* | 1/2018 | Feuersaenger | H04W 72/042 |

FOREIGN PATENT DOCUMENTS

| | | |
|---|---|---|
| JP | 2007-243794 A | 9/2007 |
| JP | 2009-207147 A | 9/2009 |

OTHER PUBLICATIONS

Richard W. Buskens, et al., "Reliable Multicasting of Continuous Data Streams", Bell Labs Technical Journal, vol. 2, No. 2, Mar. 21, 1997, pp. 151-174, XP000695173.

Office Action dated Oct. 24, 2017 in Japanese Patent Application No. 2014-090257.

* cited by examiner

[Fig. 1]
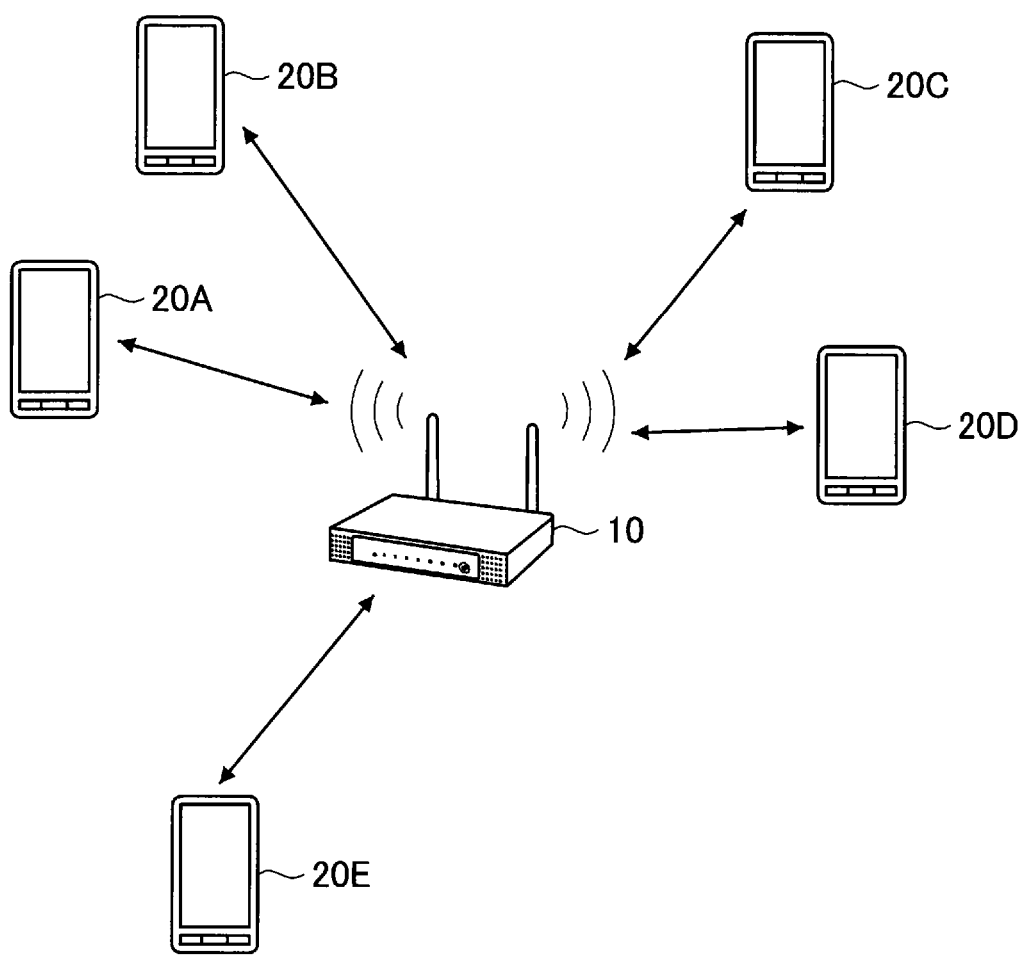

[Fig. 2]
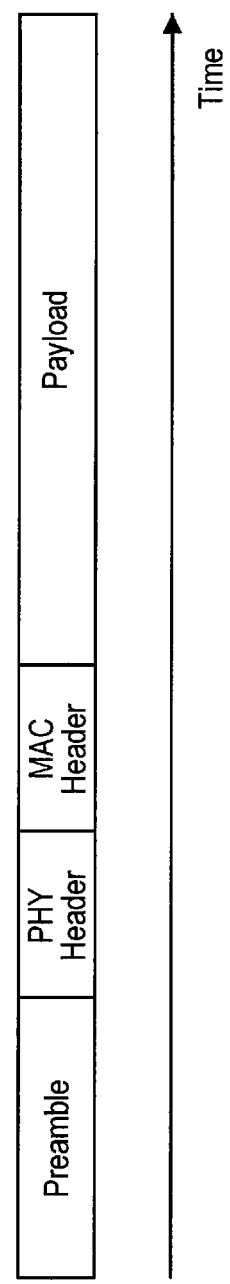

[Fig. 3]
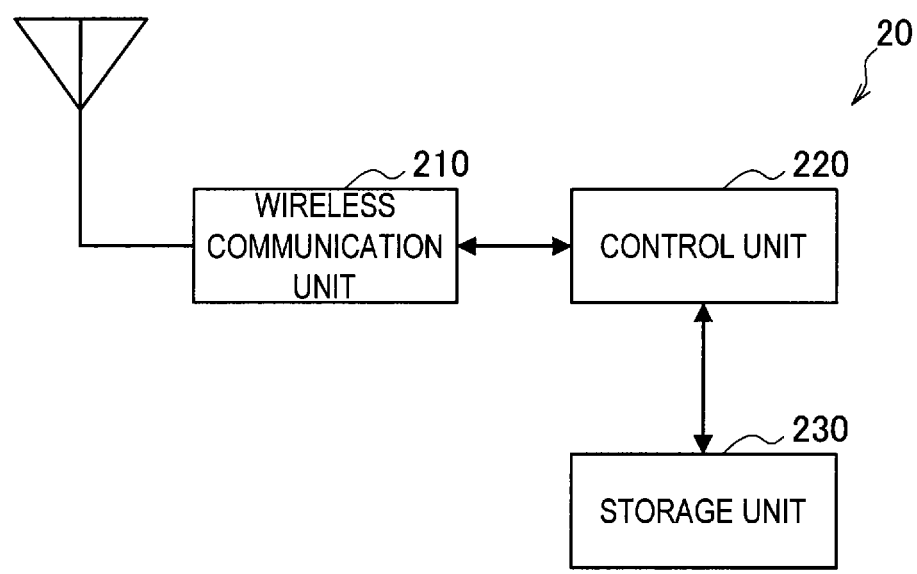

[Fig. 4]
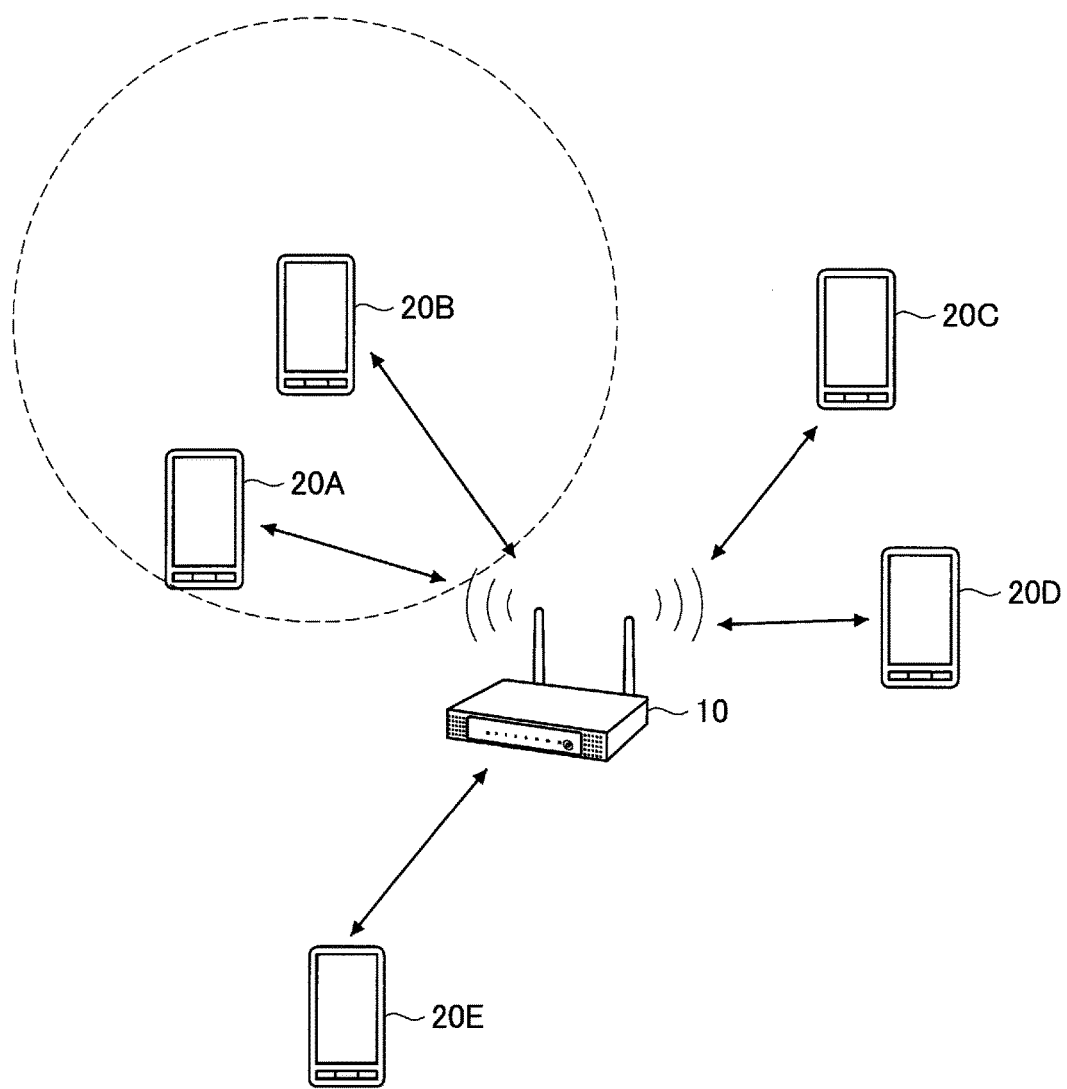

[Fig. 5]
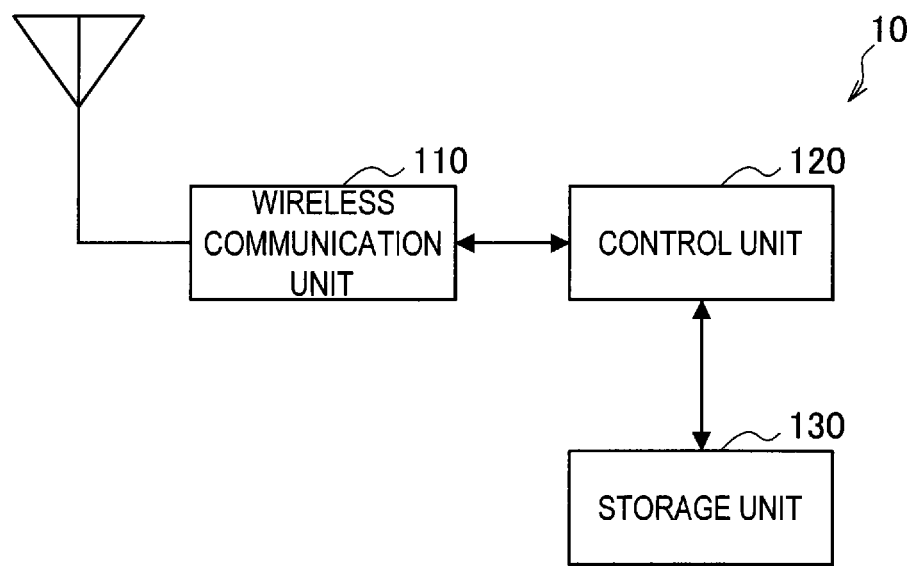

[Fig. 6]
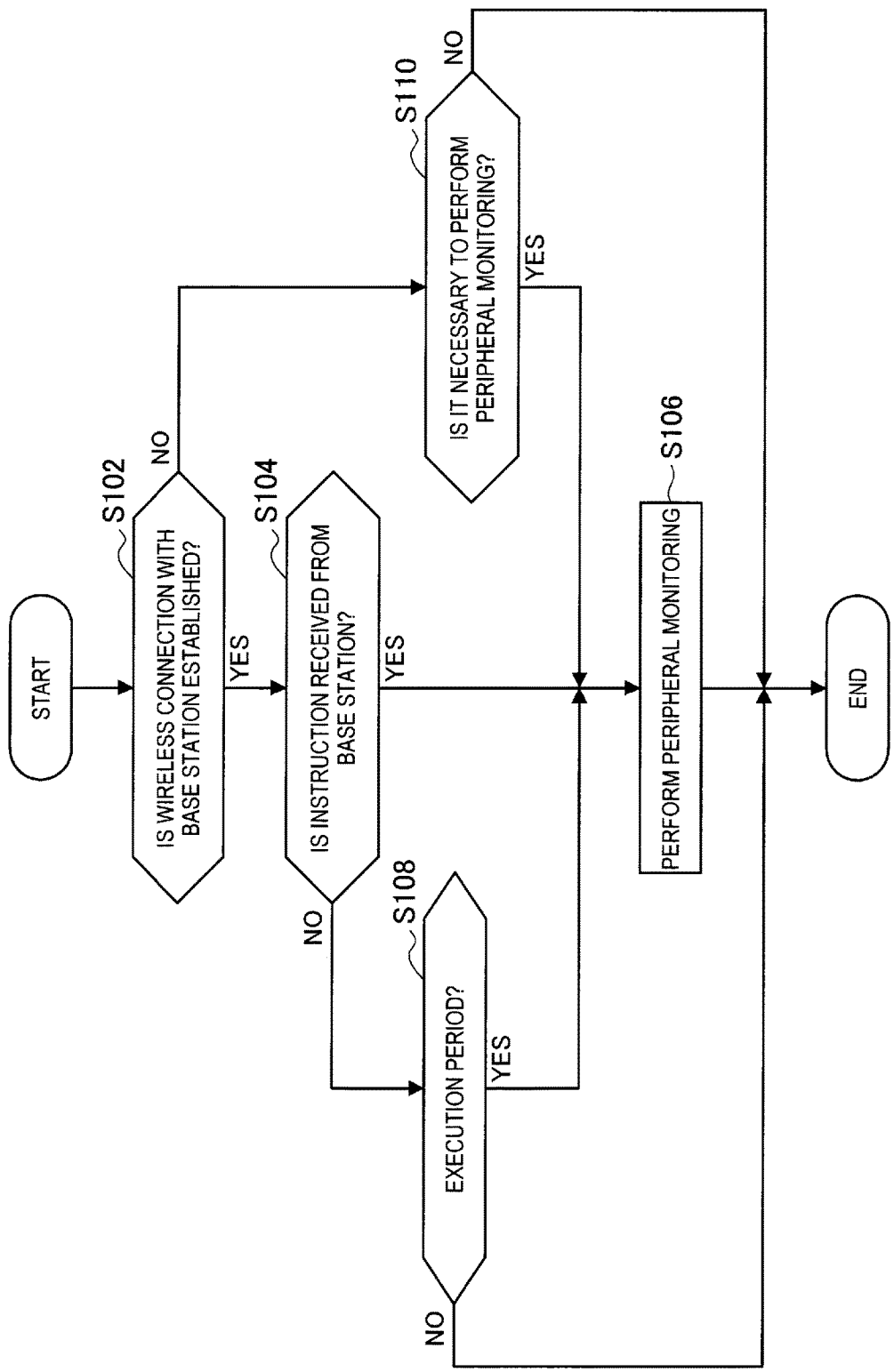

[Fig. 7]
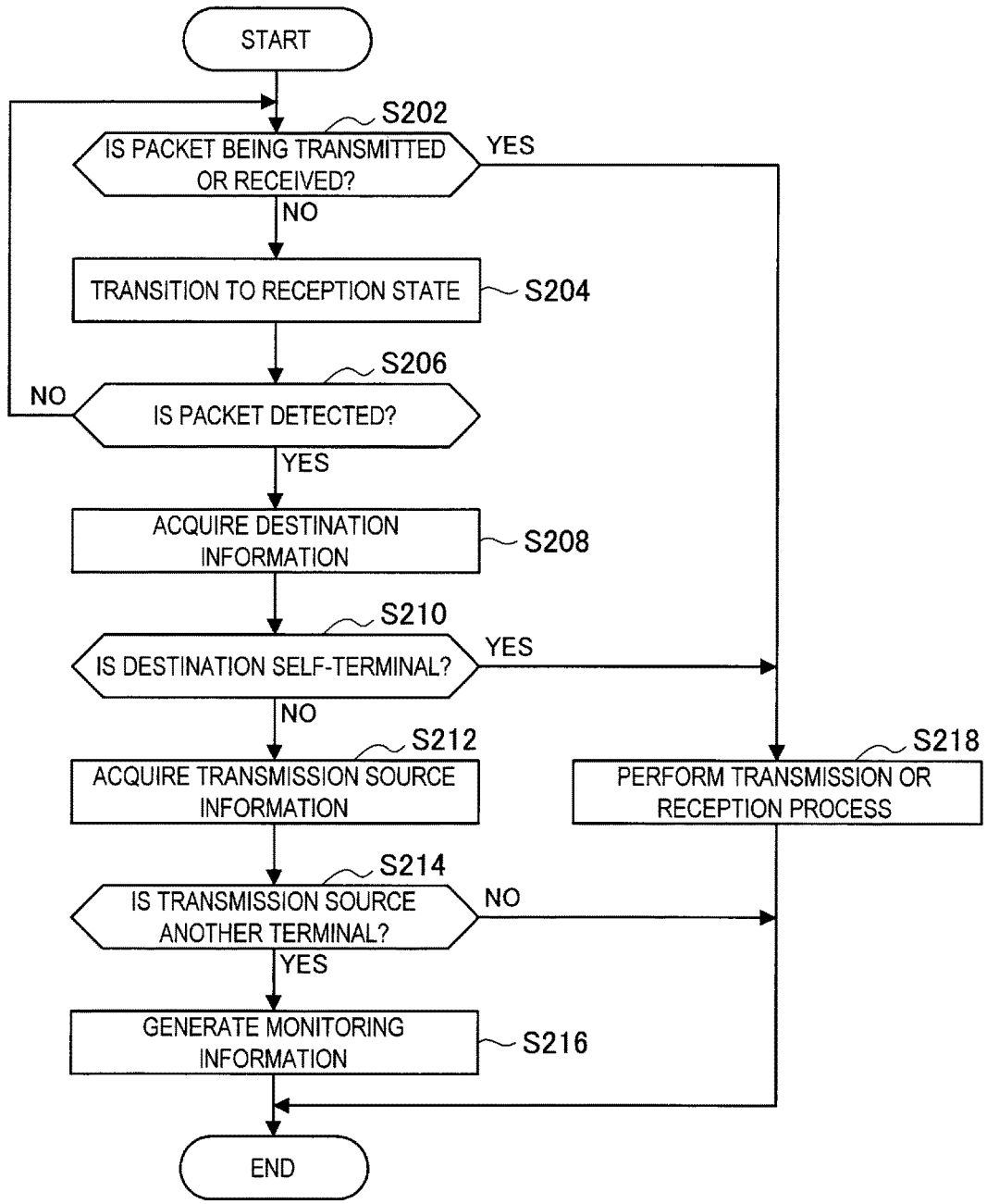

[Fig. 8]
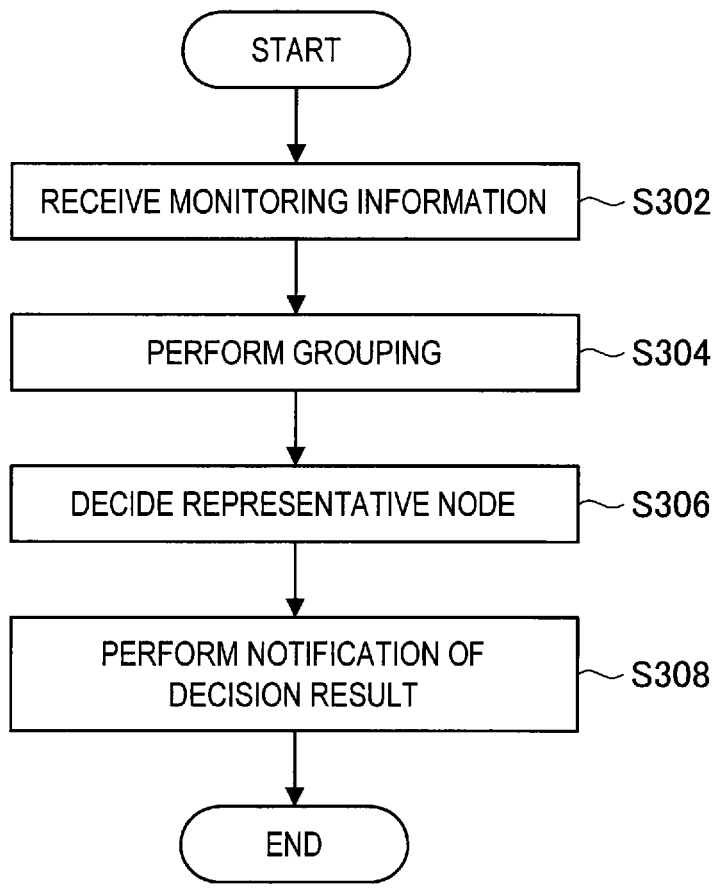

[Fig. 9]
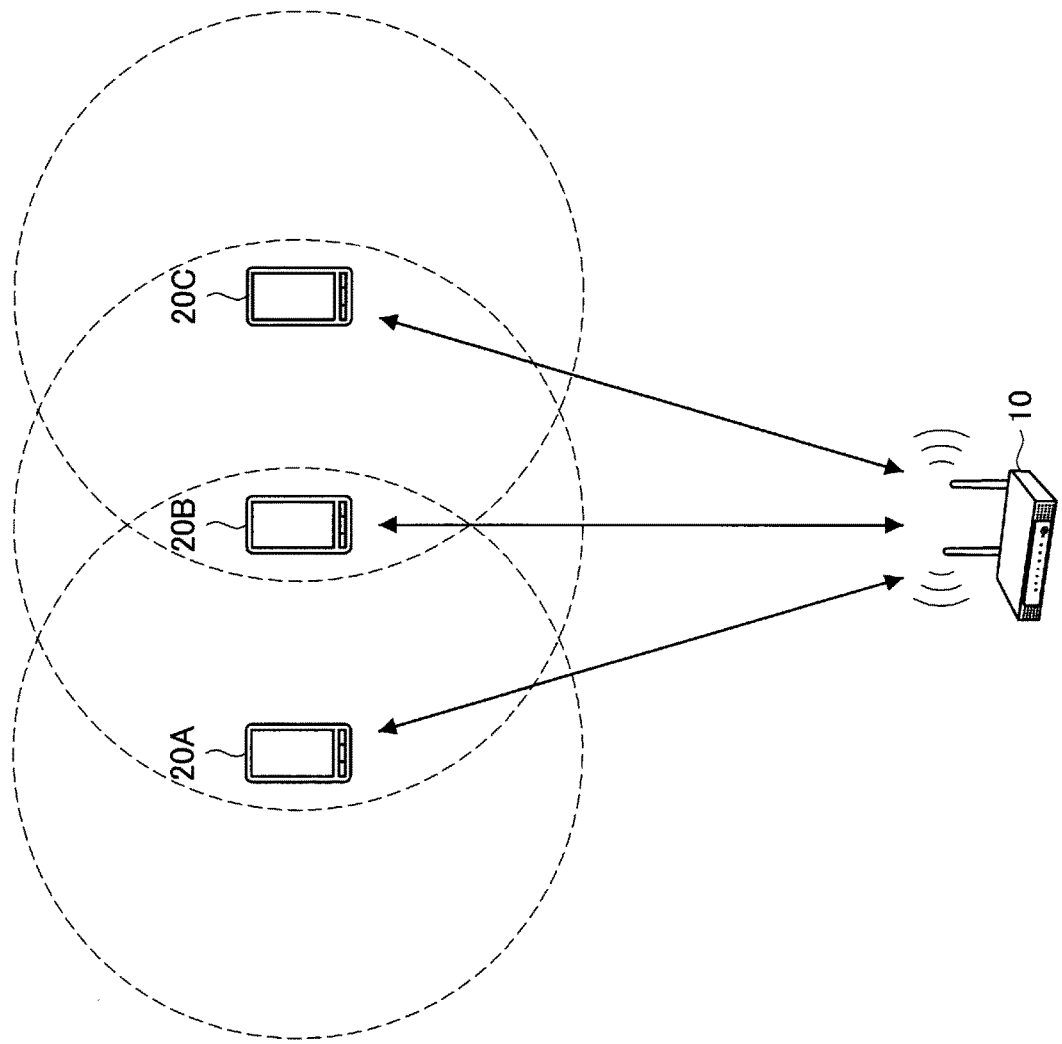

[Fig. 10]
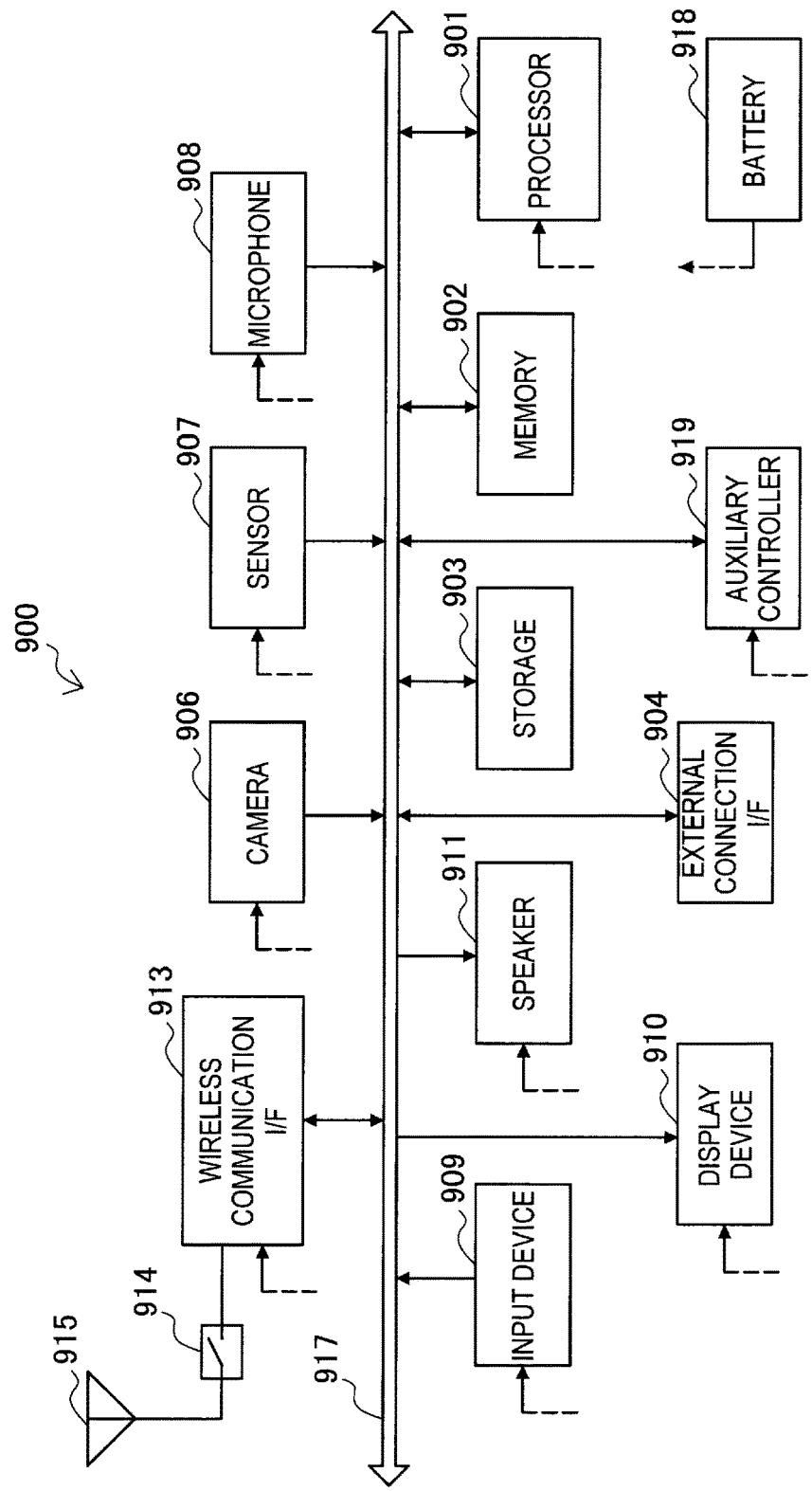

[Fig. 11]
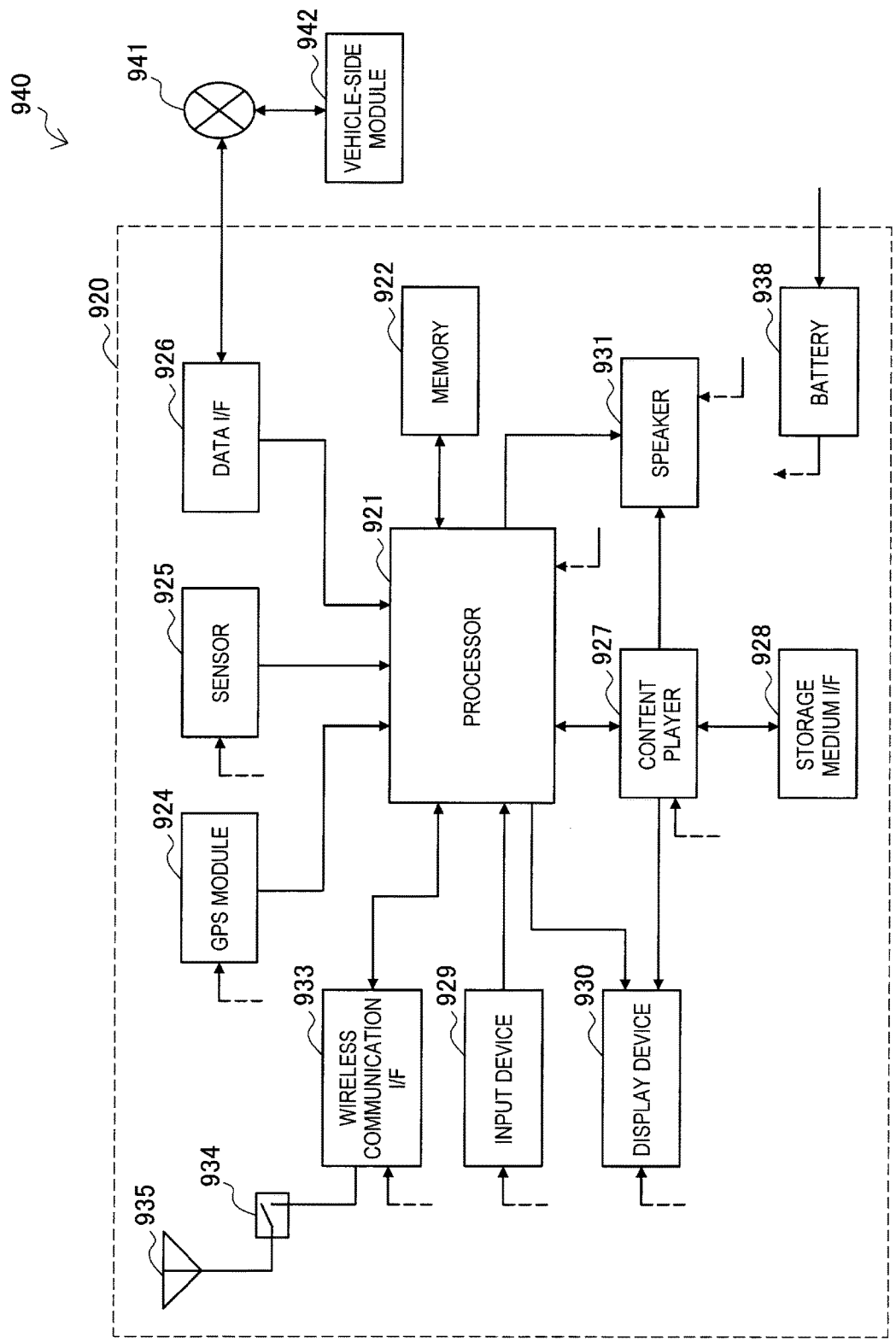

[Fig. 12]
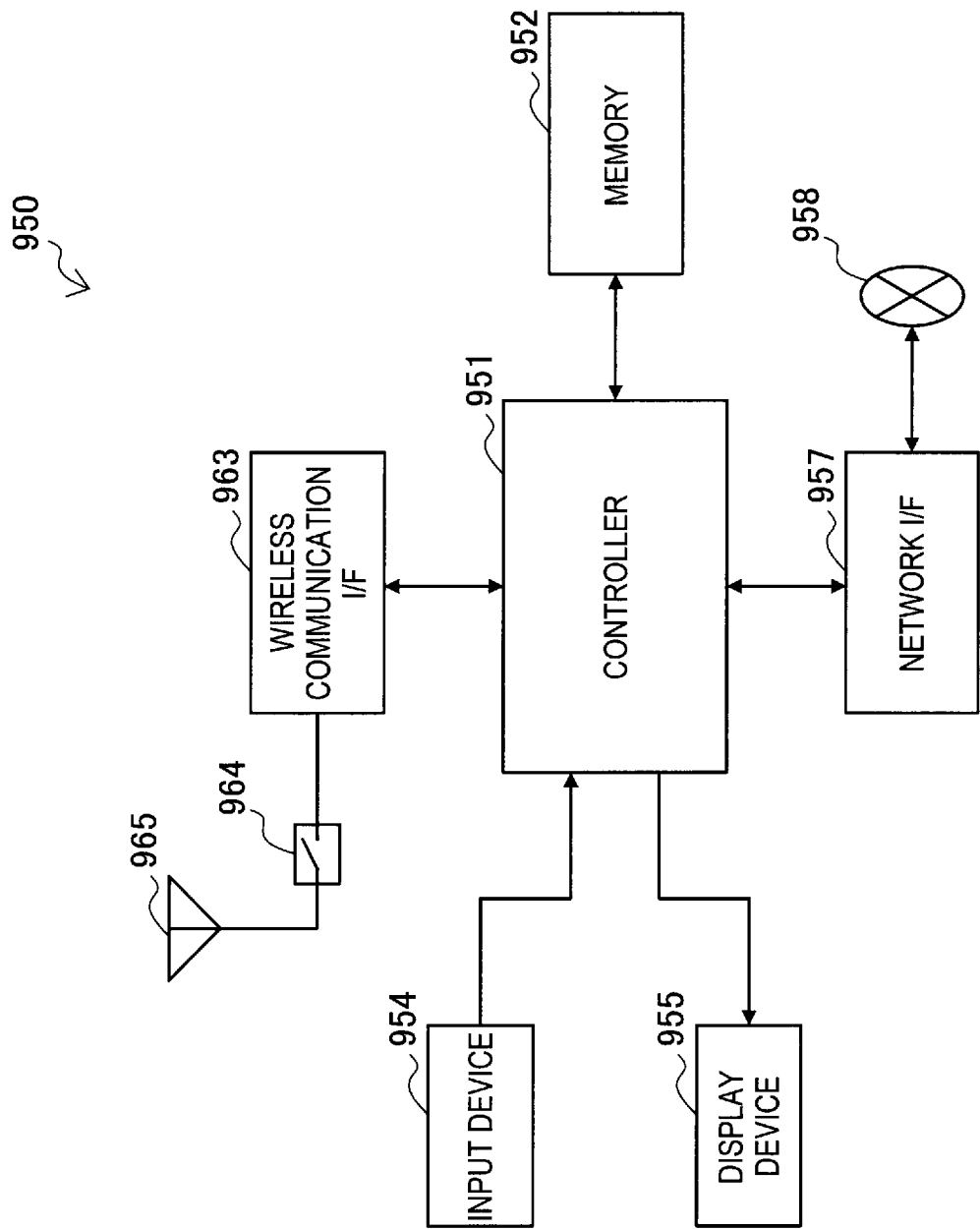

SYSTEM, ELECTRONIC DEVICE, AND METHOD

CROSS REFERENCE TO RELATED APPLICATIONS

This application claims the benefit of Japanese Priority Patent Application JP 2014-090257 filed Apr. 24, 2014, the entire contents of which are incorporated herein by reference.

TECHNICAL FIELD

The present disclosure relates to a communication control device, a wireless communication device, a communication control method, and a wireless communication method.

BACKGROUND ART

In recent years, multicast transmission has been supported in various types of electronic devices. Multicast transmission is a communication scheme in which a transmission side designates a plurality of destinations and transmits one packet. For example, when multimedia content is transmitted, multicast is widely used due to its efficiency.

When a reception terminal succeeds in receiving a packet in multicast transmission, the reception terminal responds to the transmission side with an acknowledge response (ACK response). Thus, the transmission side can know a reception result of each reception terminal, thereby improving a probability of success of multicast transmission by performing a retransmission process based on the reception result. However, since the number of ACK responses increases with an increase in the number of reception terminals, transmission opportunities from the transmission side decrease, thereby deteriorating the throughput of multicast transmission. This tendency occurs more considerably when wireless resources used for the transmission and reception overlap. For this reason, technologies for improving the throughput by reducing the number of ACK responses have been developed.

For example, PTL 1 discloses a technology for grouping wireless nodes based on reception strengths when a base station receives transmission packets from the wireless nodes and deciding a representative node to respond with an ACK response to multicast transmission for each group.

PTL 2 discloses a technology for deciding a reception terminal to respond with an ACK response to multicast transmission from a transmission terminal based on distances between the transmission terminal and reception terminals.

CITATION LIST

Patent Literature

PTL 1: JP 2009-207147A
PTL 2: JP 2003-258813A

SUMMARY

Technical Problem

In the technology disclosed in PTL 1, a representative node may be decided for each concentric circular group since the reception strengths vary according to the distances centering on the transmission terminal. The same also applies to the technology disclosed in PTL 2. In such grouping, however a distance between wireless nodes belonging to the same group is long in some cases. Therefore, a radio-wave environment differs in some cases even when the wireless nodes belong to the same group. Thus, there may be a difference in the reception result of the packet from a transmission station. In a retransmission process performed depending on presence or absence of the ACK response from the representative node, for example, retransmission to the wireless node having succeeded in receiving the packet may be performed or retransmission to the wireless node having failed to receive the packet may not be performed. Therefore, it may be difficult to efficiently improve a probability of success of multicast transmission.

It is desirable to provide a novel and improved communication control device, a novel and improved wireless communication device, a novel and improved communication control method, and a novel and improved wireless communication method capable of improving a probability of success of multicast transmission more efficiently.

Solution to Problem

According to an embodiment of the present disclosure, there is provided a communication control system that receives monitoring information from a plurality of wireless terminals, the monitoring information indicating reception powers at each of the plurality of wireless terminals in a case that packets transmitted from other of the plurality of wireless terminals are received at each of the plurality of wireless terminals; and determines a representative wireless terminal from the plurality of wireless terminals based on the collected monitoring information.

According to another embodiment of the present disclosure, there is provided an electronic device comprising: circuitry configured to perform wireless communication with a base station; and control transmission of monitoring information to the base station regarding a reception power in a case that a packet transmitted from a wireless communication device is transmitted to the base station and received at the electronic device.

According to another embodiment of the present disclosure, there is provided a method comprising: receiving monitoring information from a plurality of wireless terminals, the monitoring information indicating reception powers at each of the plurality of wireless terminals in a case that packets transmitted from other of the plurality of wireless terminals are received at each of the plurality of wireless terminals; and determining a representative wireless terminal from the plurality of wireless terminals based on the collected monitoring information.

According to another embodiment of the present disclosure, there is provided a method performed by an electronic device, the method comprising: controlling transmission of monitoring information to a base station regarding a reception power in a case that a packet transmitted from a wireless communication device is transmitted to the base station and received at the electronic device.

Advantageous Effects of Invention

According to an embodiment of the present disclosure described above, it is possible to improve a probability of success of multicast transmission more efficiently.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram showing the entire configuration of a wireless communication system according to an embodiment.

FIG. 2 is a diagram showing an example of the configuration of a packet transmitted and received in the wireless communication system according to the embodiment.

FIG. 3 is a block diagram showing an example of an inner configuration of a wireless node according to the embodiment.

FIG. 4 is a diagram for describing peripheral monitoring by the wireless node according to the embodiment.

FIG. 5 is a block diagram showing an example of an inner configuration of a base station according to the embodiment.

FIG. 6 is a flowchart showing an example of the flow of a timing determination process of the peripheral monitoring performed in the wireless node according to the embodiment.

FIG. 7 is a flowchart showing an example of the flow of a peripheral monitoring process performed in the wireless node according to the embodiment.

FIG. 8 is a flowchart showing an example of the flow of a representative node deciding process performed in the wireless node according to the embodiment.

FIG. 9 is a diagram for describing decision of a representative node by the base station according to the embodiment.

FIG. 10 is a block diagram showing an example of a schematic configuration of a smartphone.

FIG. 11 is a block diagram showing an example of a schematic configuration of a car navigation device.

FIG. 12 is a block diagram showing an example of a schematic configuration of a wireless access point.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview
2. Configuration examples
2-1. Configuration example of wireless node
2-2. Configuration example of base station
3. Operation processes
3-1. Timing determination process of peripheral monitoring
3-2. Peripheral monitoring process
3-3. Representative node deciding process
4. Application example
5. Conclusion

1. Overview

First, an overview of a wireless communication system according to an embodiment of the present disclosure will be described with reference to FIGS. 1 and 2.

FIG. 1 is a diagram showing the entire configuration of a wireless communication system 1 according to an embodiment. As shown in FIG. 1, the wireless communication system 1 includes a communication control device 10 and wireless communication devices 20A, 20B, 20C, 20D, and 20E.

The communication control device 10 is a device that controls wireless communication in a cell administrated by a base station. In the example of FIG. 1, the communication control device 10 is a base station. The base station 10 provides a wireless communication service to one or more terminal devices located inside the administrated cell. For example, the base station 10 can communicate with the wireless communication devices 20A, 20B, 20C, 20D, and 20E located inside the cell. The base station 10 may administrate a cell according to any kind of wireless communication scheme, i.e., a wireless Local Area Network (LAN) scheme such as Institute of Electrical and Electronics Engineers (IEEE) 802.11a, 11b, 11g, 11n, 11ac, or 11ad, a wireless Personal Area Network (PAN) scheme such as Ultra Wideband (UWB) or Zigbee, or a wireless Metropolitan Area Network (MAN) scheme such as IEEE 802.16. The base station 10 may be, for example, an access point (AP) of Wireless Fidelity (Wi-Fi: registered trademark) or the like. An embodiment of the present disclosure is not limited to the example of FIG. 1. For example, a wireless terminal that can operate as a dynamic access point (AP) may have a function of the communication control device 10. Further, a wireless terminal that can communicate with a control node or base station superordinate to the base station may have a function of the communication control device 10 controlling wireless communication in the cell administrated by the base station.

The wireless communication devices 20A, 20B, 20C, 20D, and 20E are wireless nodes (wireless terminals) that can perform wireless communication with the base station. The wireless node 20 can establish wireless connection with the base station 10 for which the self-wireless node is set to be the range of the cell to transmit and receive packets. For example, a case in which the base station 10 performs multicast transmission by setting the wireless nodes 20A to 20E as targets is assumed. Of course, the base station 10 may set some of the wireless nodes 20A to 20E with which the wireless connection is established as the targets of the multicast transmission rather than all of the wireless nodes 20A to 20E. The wireless nodes 20A to 20E may not only receive the multicast transmission from the base station 10, but may also perform individual communication with the base station 10.

In the present specification, when it is not necessary to distinguish the wireless communication devices 20A to 20E from each other, the wireless communication devices 20A to 20E are collectively referred to as the wireless nodes 20 by omitting letters at the ends of the reference numerals. The same also applies to other constituent elements. Subsequently, an example of the configuration of a packet transmitted and received in the wireless communication system 1 will be described with reference to FIG. 2.

FIG. 2 is a diagram showing an example of the configuration of a packet transmitted and received in the wireless communication system 1 according to the embodiment. As shown in FIG. 2, the packet can include a preamble, a PHY header, a MAC header, and a payload. The preamble has a fixed pattern used to perform packet detection and frequency synchronization in the physical layer on a reception side. The PHY header is a field in which parameters of the physical layer are described. For example, a modulation scheme of the payload and the like are described. The MAC header is a field in which parameters of the Media Access Control (MAC) layer are described. The payload is a field in which data is stored.

In the MAC header, for example, a type of packet such as a data packet or a control packet is described. Further, identification information (transmission source information) regarding a transmission source and identification information (destination information) regarding a destination are described. For example, in the MAC header of a packet destined to be transmitted to the base station 10 by the wireless node 20A, identification information regarding the wireless node 20A is described as transmission source information and identification information regarding the base station 10 is described as destination information. The identification information may be, for example, a MAC address. In the case of a packet transmitted by the multicast transmission, a multicast address is described in the destination information instead of the identification information regarding an individual terminal. The multicast address is a special address defined according to each wireless specification and is defined so that the multicast address can be distinguished from an address which a terminal uniquely has. The example of the configuration of the packet has been described above.

In multicast transmission, as described above, the technologies for reducing the number of ACK responses and preventing a throughput from deteriorating by deciding a representative node to respond with an ACK response have been suggested. In the technologies disclosed in the foregoing patent literatures, however, the method of grouping wireless nodes and the decision of a representative node are not appropriate. Specifically, in the technologies disclosed in the foregoing patent literatures, because of a difference in a radio-wave environment between the wireless nodes included in the same group, a reception result of the representative node may not be said to represent reception results of the other wireless nodes included in the group. For this reason, in the technologies disclosed in the foregoing patent literatures, it may be difficult to improve a probability of success of multicast transmission efficiently even when a retransmission process is performed depending on presence or absence of the ACK response from the representative node. In general, since a transmission side is not able to know the reception results of the wireless nodes except for the reception result of the representative node, the transmission side selects a modulation scheme for which there is a high probability of the reception to transmit a packet. For example, a transmission terminal adds much redundant information to improve noise tolerance and uses a modulation scheme for which the degree of modulation is low, such as Binary Phase-Shift Keying (BPSK) modulation. For this reason, the throughput may further deteriorate and the efficiency of the multicast transmission may deteriorate. Accordingly, in an embodiment of the present disclosure, it is desirable to provide a structure for improving the probability of success of multicast transmission more efficiently by performing appropriate grouping and decision of a representative node. The structure will be described in detail below.

2. Configuration Examples 2-1. Configuration Example of Wireless Node

FIG. 3 is a block diagram showing an example of an inner configuration of the wireless node 20 according to the embodiment. As shown in FIG. 3, the wireless node 20 includes a wireless communication unit 210, a control unit 220, and a storage unit 230.

(1) Wireless Communication Unit 210

The wireless communication unit 210 is a wireless communication interface through which the wireless node 20 relays wireless communication with other devices. In the embodiment, the wireless communication unit 210 performs wireless communication with the base station 10. For example, the wireless communication unit 210 receives a packet transmitted from the base station 10 and outputs the packet to the control unit 220. The wireless communication unit 210 may also have functions of an amplifier, a frequency converter, a demodulator, and the like, and can acquire data stored in a received wireless signal and output the data to the control unit 220. The wireless communication unit 210 transmits a packet output from the control unit 220 to the base station 10 via an antenna. The wireless communication unit 210 may also have functions of a modulator, an amplifier, and the like, and may also perform modulation, power amplification, and the like, for example, on a packet storing monitoring information to be described below and transmit the packet to the base station 10. In the example shown in FIG. 3, one antenna is shared in the transmission and reception, but separate antennas may also be used.

The wireless communication unit 210 can perform wireless communication with the other wireless nodes 20 as well as the communication with the base station 10. For example, the wireless node 20 can perform Peer-to-Peer (P2P) type wireless communication to establish wireless connection with the wireless node 20 as well as the star-type wireless communication in which the base station 10 shown in FIG. 1 is centered. The wireless communication unit 210 can receive packets which the other wireless nodes 20 transmit to the base station 10 or the other wireless node 20. The wireless communication unit 210 can also function as a measurement unit that measures a reception strength (reception power) at the time of the reception of such a wireless signal and outputs information indicating a measurement result to the control unit 220.

(2) Control Unit 220

The control unit 220 functions as a calculation processing device and a control device and has a function of controlling all of the operations in the wireless node 20 according to various programs. For example, the control unit 220 controls the wireless communication unit 210 such that monitoring information regarding the reception power when a packet transmitted from another wireless node 20 is received by the wireless communication unit 210 is transmitted to the base station 10. The monitoring information refers to information that includes the identification information regarding another wireless node 20 transmitting a packet for which the reception power is higher than a threshold value (monitoring threshold value). The attenuation of a radio wave increases as a distance between transmission and reception sides increases. On the assumption that the transmission powers of all the wireless nodes 20 are the same, a reception power increases as the distance between the wireless nodes 20 is closer. Therefore, the monitoring information can also be understood as information indicating another wireless node 20 which is present at a position close to the self-wireless node 20. The monitoring information may include the identification information regarding the self-wireless node 20 collecting the monitoring information. When there is a difference in the transmission power between the wireless nodes 20, for example, the control unit 220 may collect the identification information regarding the wireless node 20 for which a difference between the transmission power and the reception power is less than the threshold value (of which a distance is close). In this case, it is necessary for the wireless node 20 to know a transmission power of the other wireless node 20 in advance. For example, information indicating the transmission power of the wireless node 20 may be included in a packet transmitted from the wireless node 20 and read from a detected packet or the base station 10 may collect or store the transmission powers of all wireless nodes 20, store the transmission powers in a beacon, and transmit the signal to each wireless node 20.

Here, the control unit 220 may collect, as monitoring information, the identification information regarding another wireless node 20 which is a transmission source of a packet of which the reception power is greater than the monitoring threshold value and of which a destination is not the self-wireless node. Thus, the wireless node 20 can detect a packet from another wireless node 20 to the base station 10 in the case of the star type and detect a packet from another wireless node 20 to still another wireless node 20 in the case of the P2P type, and can generate the monitoring information. A packet which is transmitted from another wireless node 20 and of which a destination is not the self-wireless node is also referred to as an interception signal below. Further, measuring the reception power of the interception signal and collecting the monitoring information is also referred to as peripheral monitoring below.

The monitoring threshold value may be a value which is different from a reception threshold value used for the wireless communication unit 210 to receive a packet of which a destination is the self-wireless node. For example, the packet of which a destination is the self-wireless node can be transmitted from the base station 10 in regard to the star type and can be transmitted from another wireless node 20 in regard to the P2P type. Any monitoring threshold value can be set according to the granularity of a group, the transmission power of the wireless node 20, reception characteristics, or the like. Here, a relation between the monitoring threshold value and a packet detectable range will be described with reference to FIG. 4. FIG. 4 is a diagram for describing the peripheral monitoring by the wireless node 20 according to the embodiment. A dashed line of FIG. 4 indicates a distance in which the wireless node 20B can perform the peripheral monitoring. A wireless signal transmitted from the wireless node 20 located within the range indicated by the dashed line can be detected (intercepted). The higher the monitoring threshold value is, the closer a distance with the wireless node which can intercept a packet is. Thus a range in which the peripheral monitoring can be performed is narrowed and the granularity of the group becomes finer. Conversely, the lower the monitoring threshold value is, the longer a distance with the wireless node which can intercept a packet is. Thus, the range in which the peripheral monitoring can be performed is broadened and the granularity of the group becomes rougher. The monitoring threshold value may also be stored in advance in the storage unit 230 to be described below or may also be changed dynamically. For example, the monitoring threshold value may be set through notification of a beacon or the like received by the wireless communication unit from the base station 10.

When the wireless node 20 is not transmitting or receiving a packet to or from the base station 10, the wireless node 20 performs the peripheral monitoring. Meanwhile, the control unit 220 can perform the peripheral monitoring at various timings. For example, the control unit 220 may perform the peripheral monitoring before the establishment of the wireless connection with the base station 10. The control unit 220 may perform the peripheral monitoring while transmission or reception of a packet to or from the base station 10 is not performed. The control unit 220 may perform the peripheral monitoring based on a notification received by the wireless communication unit 210 from the base station 10 giving an instruction to perform the peripheral monitoring. The monitoring information collected in this way can be reported to the base station 10 through various methods. For example, the control unit 220 may also store the monitoring information in an ACK response packet to reception from the base station 10 to transmit the monitoring information. When the peripheral monitoring is performed before the establishment of the wireless connection with the base station 10, the control unit 220 may also store the monitoring information in a connection request packet used to establish the wireless connection with the base station 10 to transmit the monitoring information. The control unit 220 may also store the monitoring information in a packet used to transmit data from the wireless node 20 to the base station 10 to transmit the monitoring information. In this case, the control unit 220 may also transmit the monitoring information to the base station 10 periodically or may also transmit the monitoring information in response to a request from the base station 10. Thus, the monitoring information can be stored as a part of a packet used to transmit certain data in a packet. Further, the control unit 220 may also store the monitoring information in a packet dedicated to transmission of the monitoring information to the base station 10 to transmit the monitoring information. The monitoring information can be stored in at least either of the MAC header and the payload in the configuration of the packet shown in FIG. 2 described above.

(3) Storage Unit 230

The storage unit 230 stores various kinds of information used in the wireless node 20. For example, the storage unit 230 may also store setting information for transmission and reception of wireless signals for the monitoring threshold value, the reception threshold value, a transmission power to be used, wireless resources, and the like. The storage unit 230 may accumulate the monitoring information collected until reporting.

The example of the inner configuration of the wireless node 20 according to the embodiment has been described above. Next, an example of an inner configuration of the base station 10 according to the embodiment will be described with reference to FIG. 5.

2-2. Configuration Example of Base Station

FIG. 5 is a block diagram showing an example of an inner configuration of the base station 10 according to the embodiment. As shown in FIG. 5, the base station 10 includes a wireless communication unit 110, a control unit 120, and a storage unit 130.

(1) Wireless Communication Unit 110

The wireless communication unit 110 is a wireless communication interface through which the base station 10 relays wireless communication with other devices. In the embodiment, the wireless communication unit 110 performs wireless communication with the wireless nodes 20. For example, the wireless communication unit 110 receives a packet transmitted from the wireless node 20 and outputs the packet to the control unit 120. The wireless communication unit 110 may have functions of an amplifier, a frequency converter, a demodulator, and the like, and can acquire data stored in a received wireless signal and output the data to the control unit 120. For example, the wireless communication unit 110 receives the monitoring information collected by the wireless node 20 from the wireless node 20 and outputs the monitoring information to the control unit 120. The wireless communication unit 110 transmits the packet output from the control unit 120 to the wireless node 20 via an antenna. The wireless communication unit 110 may have functions of a modulator, an amplifier, and the like and may designate a multicast address to a destination and perform multicast transmission to one or more wireless nodes 20. The wireless communication unit 110 can also function as a measurement unit that measures a reception strength at the time of reception of a wireless signal and may also output information indicating a measurement result to the control unit 120. In the example shown in FIG. 5, one antenna is shared in the transmission and reception, but separate antennas may also be used.

(2) Control Unit 120

The control unit 120 functions as a calculation processing device and a control device and has a function of controlling all of the operations in the base station 10 according to various programs. For example, the control unit 120 controls the wireless node 20 through the wireless communication unit 110 such that the monitoring information regarding the reception power at the time of the reception of packets transmitted from the other wireless nodes 20 is collected. For example, the control unit 120 transmits information giving an instruction to perform the peripheral monitoring to the wireless nodes 20 through the wireless communication unit 110. For example, a flag giving an instruction to perform the peripheral monitoring may also be defined in the MAC header of the packet shown in FIG. 2. The control unit 120 can give an instruction to perform the peripheral monitoring through ON or OFF of the flag. A field designating the wireless node 20 performing the peripheral monitoring may also be defined in the MAC header. The control unit 120 can cause the designated wireless node 20 to perform the peripheral monitoring by describing the identification information regarding the wireless node 20 caused to perform the peripheral monitoring in the field.

The base station 10 receives a report of the monitoring information from the wireless node 20 at the various timings and according to the various methods described above. Then, based on the collected monitoring information, the control unit 120 groups the plurality of wireless nodes 20. Specifically, the control unit 120 groups the wireless nodes 20 present at mutually close distances based on the identification information included in the monitoring information. As described above, the monitoring information is information that includes the identification information regarding the wireless nodes 20 present at a close distance from the wireless node 20 collecting the monitoring information. Referring to the monitoring information or referring to the identification information regarding a transmission source of a packet, the control unit 120 can identify the wireless node 20 collecting the monitoring information, and thus can calculate a combination of the wireless nodes 20 present at the mutually close distances based on the monitoring information. The control unit 120 performs the grouping by integrating the combination of the wireless nodes 20 present at the mutually close distances. Thus, the control unit 120 can group the wireless nodes 20 by setting an aggregation of one or more wireless nodes 20 decided to be present at the mutually close distances as one group.

The control unit 120 sets the wireless node 20 which is a multicast transmission target as a grouping target, and can also include the wireless node 20 which has not reported the monitoring information as the grouping target. The control unit 120 may perform the grouping through the grouping performed once in a fixed manner or may also update the grouping by performing the grouping repeatedly using newly collected monitoring information. The control unit 120 can set any granularity of the group according to the transmission power of the wireless node 20, reception characteristics, or the like.

The control unit 120 decides one wireless node 20 to respond with the ACK response to the multicast transmission by the wireless communication unit 210 for each group. The wireless node 20 responding with the ACK response is also referred to as a representative node (representative terminal) 20 below. The control unit 120 notifies each wireless node 20 of a decision result of the representative node 20 so that the representative node 20 responds with the ACK response and the wireless nodes 20 other than the representative node 20 do not respond with the ACK response. Thus, since only the representative node 20 responds with the ACK response, the number of ACK responses in the entire wireless communication system 1 is reduced, thereby improving the throughput.

The control unit 120 performs a retransmission process depending on presence or absence of the ACK response from the representative node 20. For example, the control unit 120 retransmits a packet to the group in which the representative node 20 does not respond with the ACK response. Here, since the control unit 120 groups the wireless nodes 20 present at the mutually close distances, the retransmission target wireless nodes 20 are located fixedly in a specific direction from the viewpoint from the base station 10. Accordingly, the control unit 120 may also control the wireless communication unit 110 so that beam forming is performed in the specific direction in which the retransmission target wireless nodes 20 are located. Thus, a probability of success in reception of the retransmitted packet is improved, thereby improving the efficiency of the multicast transmission. In the technologies disclosed in the foregoing patent literatures, the group can be formed concentrically. Therefore, it is necessary to retransmit a packet in all directions from the viewpoint of the base station, and thus it is difficult to adopt the beam forming technology.

The control unit 120 may also transmit a beacon packet through the wireless communication unit 110. For example, the control unit 120 transmits the beacon packet periodically so that the base station 10 and the wireless nodes 20 are synchronized. The control unit 120 may also store information designating the monitoring threshold value in the beacon packet. Thus, the control unit 120 can adjust distances with the other wireless nodes 20 which the wireless node 20 can monitor and can consequently adjust the granularity of the group. Further, the control unit 120 may also store information indicating the transmission power of each wireless node 20 in the beacon packet.

(3) Storage Unit 130

The storage unit 130 stores various kinds of information used in the base station 10. For example, the storage unit 130 may also store setting information for transmission and reception of wireless signals of the identification information regarding the wireless nodes 20 which are multicast transmission targets, the collected monitoring information, the transmission powers of the wireless nodes 20, wireless resources to be used, and the like.

The example of the inner configuration of the base station 10 according to the embodiment has been described above. Next, an operation process of the wireless communication system 1 according to the embodiment will be described with reference to FIGS. 6 to 9.

3. Operation Processes 3-1. Timing Determination Process of Peripheral Monitoring FIG. 6 is a flowchart showing an example of the flow of a timing determination process of the peripheral monitoring performed in the wireless node 20 according to the embodiment.

As shown in FIG. 6, in step S102, the wireless node 20 first determines whether the wireless node 20 is in the wireless connection with the base station 10. For example, the control unit 220 determines whether the wireless connection with the base station 10 is established by the wireless communication unit 210.

When the wireless node 20 determines that the wireless connection is established (YES in S102), the wireless node 20 determines whether to receive the instruction to perform the peripheral monitoring from the base station 10 in step S104. For example, referring to the MAC header of the packet received from the base station 10, the control unit 220 determines whether the flag instructing the wireless node to perform the peripheral monitoring is turned ON and whether the self-wireless node is designated as the wireless node 20 performing the peripheral monitoring.

When the wireless node 20 determines that the instruction is given from the base station 10 (YES in S104), the wireless node 20 determines that a current timing is the timing at which the peripheral monitoring is performed and performs the peripheral monitoring in step S106. Specific processing details of the peripheral monitoring will be described in detail below.

Conversely, when the wireless node 20 determines that no instruction is given from the base station 10 (NO in S104), the wireless node 20 determines whether a current time is an execution period of the peripheral monitoring in step S108. For example, referring to the execution period of the peripheral monitoring stored in the storage unit 230, the control unit 220 determines whether the current time is the execution period.

When the wireless node 20 determines that the current time is the execution period (YES in S108), the wireless node 20 determines that the current timing is a timing at which the peripheral monitoring is performed and performs the peripheral monitoring in step S106. Conversely, when the wireless node 20 determines that the current time is not the execution period (NO in S108), the process ends.

Conversely, when the wireless node 20 determines that the wireless connection with the base station 10 is not established (NO in S102), the wireless node 20 determines whether it is necessary to perform the peripheral monitoring in step S110. For example, the wireless node 20 may include a positional information acquisition unit that acquires positional information from the Global Positioning System (GPS) and the control unit 220 may determine that it is necessary to perform the peripheral monitoring based on the acquired positional information when the wireless node 20 has moved. The control unit 220 may determine that it is necessary to perform the peripheral monitoring when the current time is the execution period of the peripheral monitoring. This execution period may also be different from the execution period during the wireless connection with the base station 10 in step S108 described above.

When the wireless node 20 determines that it is necessary to perform the peripheral monitoring (YES in S110), the wireless node 20 determines that a current timing is the timing at which the peripheral monitoring is performed and performs the peripheral monitoring in step S106. When the wireless node 20 determines that it is not necessary to perform the peripheral monitoring (NO in S110), the wireless node 20 ends the process.

The example of the flow of the timing determination process of the peripheral monitoring performed in the wireless node 20 has been described above. The wireless node 20 may repeatedly perform this process at a predetermined time interval. Next, a specific operation process of the peripheral monitoring performed in the wireless node 20 will be described with reference to FIG. 7.

3-2. Peripheral Monitoring Process

FIG. 7 is a flowchart showing an example of the flow of a peripheral monitoring process performed in the wireless node 20 according to the embodiment.

As shown in FIG. 7, in step S202, the wireless node 20 first determines whether a packet is being transmitted or received. For example, the control unit 220 determines whether the wireless communication unit 210 transmits or receives the packet to or from the base station 10.

When the wireless node 20 determines that the packet is being transmitted or received (YES in S202), the wireless node 20 continues the packet transmission or reception process in step S218.

When the wireless node 20 determines that the packet is not being transmitted or received (NO in S202), the wireless node 20 transitions to a reception state in step S204.

Next, the wireless node 20 determines whether to detect the packet in step S206. In the reception state, the wireless node 20 can detect a packet when another neighboring wireless node 20 transmits the packet. Specifically, the control unit 220 monitors whether the reception power when the wireless communication unit 210 receives a wireless signal exceeds the monitoring threshold value. When the reception power exceeds the monitoring threshold value, the control unit 220 detects the packet. Conversely, when the reception power does not exceed the monitoring threshold value, the control unit 220 detects no packet. When the packet is not detected (NO in S206), the process returns to step S202 again.

When the packet is detected (YES in S206), the wireless node 20 acquires destination information of the packet in step S208. For example, the control unit 220 acquires the destination information with reference to the MAC header.

Next, in step S210, the wireless node 20 determines whether the destination of the packet is the self-wireless node 20. For example, the control unit 220 determines whether the identification information indicated by the acquired destination information is identical to the identification information regarding the self-wireless node 20.

When the wireless node 20 determines that the destination is the self-wireless node 20 (YES in S210), the wireless node 20 performs the packet reception process in step S218. Specifically, the control unit 220 acquires the payload and delivers the payload to, for example, an upper layer of an application or the like. Such a packet includes, for example, a multicast packet from the base station 10 or a packet from another wireless node 20 in the P2P type communication.

When it is determined that the destination is not the self-wireless node 20 (NO in S210), the transmission source information of the packet is acquired in step S212. For example, the control unit 220 acquires the transmission source information with reference to the MAC header. At this time, the control unit 220 may discard the received payload portion.

Next, in step S214, the wireless node 20 determines whether the transmission source is another wireless node 20. For example, the control unit 220 determines whether the identification information regarding the acquired transmission source information is the identification information regarding another wireless node 20. When a common portion indicating the wireless node is present in the identification information regarding the wireless node 20, the control unit 220 may determine whether the transmission source is another wireless node 20 depending on whether the common portion is included in the transmission source information. The control unit 220 may determine whether the transmission source is another wireless node 20 depending on whether the identification information indicated by the transmission source information is identical to the identification information regarding the base station 10.

When the wireless node 20 determines that the transmission source is the other wireless node 20 (YES in S214), the wireless node 20 generates the monitoring information in step S216. Specifically, the wireless node 20 generates the monitoring information storing the identification information regarding another wireless node 20 of the transmission source indicated by the acquired transmission source information. When there are the plurality of interception signals of which the reception power exceeds the monitoring threshold value, the identification information regarding the plurality of wireless nodes 20 is stored in the monitoring information. Conversely, when it is determined that the transmission source is not the other wireless node 20 (NO in S214), the process ends.

The example of the flow of the peripheral monitoring process performed in the wireless node 20 has been described above. As described above, the monitoring information collected in this way is stored in, for example, an ACK response packet, a connection request packet, or a packet dedicated to reporting the monitoring information to be transmitted to the base station 10. Next, a representative node deciding process performed in the base station 10 will be described with reference to FIG. 8.

3-3. Representative Node Deciding Process

FIG. 8 is a flowchart showing an example of the flow of the representative node deciding process performed in the wireless node 20 according to the embodiment.

As shown in FIG. 8, in step S302, the base station 10 first receives the monitoring information from the wireless nodes 20. Specifically, the wireless communication unit 110 receives the packet in which the monitoring information is stored from each wireless node 20. At this time, the wireless communication unit 110 may measure the reception strength when the packet is received.

Next, in step S304, the base station 10 groups the wireless nodes 20. Here, referring back to FIG. 4, the grouping process performed by the base station 10 will be described. As shown in FIG. 4, the distance between the wireless nodes 20A and 20B and the distance between the wireless nodes 20C and 20D are closer than those between the other wireless nodes. In the wireless nodes 20A and 20B, the monitoring threshold value is assumed to be set such that the mutual nodes are within a range in which the peripheral monitoring is possible. The same also applies to the wireless nodes 20C and 20D. In this case, the base station 10 can receive the monitoring information including the identification information regarding the wireless node 20B from the wireless node 20A and receive the monitoring information including the identification information regarding the wireless node 20A from the wireless node 20B. Likewise, the base station 10 can receive the monitoring information including the identification information regarding the wireless node 20D from the wireless node 20C and receive the monitoring information including the identification information regarding the wireless node 20C from the wireless node 20D. The received monitoring information is summarized in the following Table 1.

TABLE 1

| | | Identification information included in monitoring information | | | | |
|---|---|---|---|---|---|---|
| | | 20A | 20B | 20C | 20D | 20E |
| Identification information regarding wireless nodes collecting monitoring information | 20A | | O | X | X | X |
| | 20B | O | | X | X | X |
| | 20C | X | X | | O | X |
| | 20D | X | X | O | | X |
| | 20E | X | X | X | X | |

In the foregoing Table 1, it is assumed that "20A" to "20E" indicate the identification information regarding the wireless nodes 20A to 20E, respectively, "O" indicates that the identification information is included in the monitoring information, and "X" indicates that the identification information is not included in the monitoring information.

The control unit 120 groups the plurality of wireless nodes 20 included in the wireless communication system 1 based on the monitoring information. For example, the wireless nodes 20 mutually indicated by "O" in the foregoing Table 1 are located at least within the range in which the peripheral monitoring is possible, and thus are located within the closer distance than the other wireless nodes 20. Therefore, the control unit 120 considers the wireless nodes 20 for which the mutual identification information is included in the mutually collected monitoring information as the wireless nodes 20 present at the mutually close distance and groups the wireless nodes 20. For example, the control unit 120 groups the wireless nodes 20A and 20B and groups the wireless nodes 20C and 20D. The control unit 120 considers the wireless nodes 20 collecting null monitoring information as the wireless nodes 20 located at a remote distance from the other wireless nodes 20 and forms the wireless node 20 alone as one group. For example, the control unit 120 forms the wireless node 20E as one group. In the example shown in FIG. 4, the control unit 120 forms a total of three groups, the wireless nodes 20A and 20B, the wireless nodes 20C and 20D, and the wireless node 20E.

The process of grouping the wireless nodes 20 by the base station 10 in step S304 has been described above.

Subsequently, in step S306, the base station 10 decides the representative node 20. Methods of deciding the representative node 20 are considered to be diverse. Hereinafter, an example of a method of deciding the representative node 20 will be described.

For example, the control unit 120 can decide the representative node 20 based on the reception power which is the reception power when the packet including the monitoring information is received and is the reception power measured in step S302 and transmitted from the wireless node 20.

For example, the control unit 120 may decide, as the representative node 20, the wireless node 20 of which the reception power when the wireless communication unit 110 receives the packet including the monitoring information is the highest among one or more wireless nodes 20 belonging to the same group. On the assumption that the transmission powers of all the wireless nodes 20 are the same, the wireless node 20 of which the reception power is the highest in the group is the wireless node 20 of which the distance with the base station 10 is the closest in the group. Therefore, since the base station 10 performs the retransmission process based on presence or absence of the ACK response from the wireless node 20 of which the distance is the closest, i.e., with the highest probability of success in reception within the group, it is possible to suppress the number of retransmissions while maintaining a constant probability of success of the multicast transmission.

Further, the control unit 120 may decide, as the representative node 20, the wireless node 20 of which the reception power when the wireless communication unit 110 receives the packet including the monitoring information is the lowest among one or more wireless nodes 20 belonging to the same group. On the assumption that the transmission powers of all the wireless nodes 20 are the same, the wireless node 20 of which the reception power is the lowest in the group is the wireless node 20 of which the distance with the base station 10 is the remotest in the group. Therefore, since the base station 10 performs the retransmission process based on presence or absence of the ACK response from the wireless node 20 of which the distance is the remotest, i.e., with the lowest probability of success in reception within the group, it is possible to improve the probability of success of the multicast transmission.

Furthermore, the control unit 120 may decide, as the representative node 20, the wireless node 20 of which the reception power when the wireless communication unit 110 receives the packet including the monitoring information is average among one or more wireless nodes 20 belonging to the same group. For example, the average indicates that the reception power is the closest to an average value or is an intermediate value, a median value, or the like. On the assumption that the transmission powers of all the wireless nodes 20 are the same, the wireless node 20 of which the reception power is average in the group is the wireless node 20 of which the distance with the base station 10 is average in the group. Therefore, since the base station 10 performs the retransmission process based on presence or absence of the ACK response from the wireless node 20 of which the distance is average, i.e., with average probability of success in reception within the group, the improvement in the probability of success of the multicast transmission and the suppression in the number of retransmissions can be compatible.

Thus, the control unit 120 can decide, as the representative node 20, any one of the wireless nodes 20 of which the reception power when the packet is received from the wireless node 20 is the highest, the lowest, or average. The transmission powers of all the wireless nodes 20 have been assumed to be the same above, but a case in which the transmission powers differ among the wireless nodes 20 can also be considered. In this case, the control unit 120 can decide, as the representative node 20, any one of the wireless nodes 20 for which a difference between the transmission power of the wireless node 20 and the reception power in the wireless communication unit 110 is the smallest, the largest, or average.

Further, the control unit 120 may decide the representative node 20 based on a positional relation between the wireless nodes 20 belonging to the same group. Specifically, the control unit 120 may decide, as the representative node 20, the wireless node 20 which is located at the center of one or more wireless nodes 20 belonging to the same group and is indicated by the identification information included in the monitoring information. For example, the control unit 120 decides, as the representative node 20, the wireless node 20 acquiring the monitoring information including the largest number of pieces of identification information among one or more wireless nodes 20 belonging to the same group. This is because more other wireless nodes 20 are included in the range in which the peripheral monitoring is possible with respect to the wireless node 20 located at the center on the assumption that the monitoring threshold values are the same among the wireless nodes 20. Here, the method of deciding the representative node 20 based on the positional relation will be described with reference to FIG. 9.

FIG. 9 is a diagram for describing decision of the representative node 20 by the base station 10 according to the embodiment. In FIG. 9, a dashed line indicates a distance in which each wireless node 20 can perform the peripheral monitoring and can detect a wireless signal transmitted from the wireless node 20 located within the range indicated by the dashed line. As shown in FIG. 9, the wireless node 20A can detect a wireless signal transmitted from the wireless node 20B. The wireless node 20B can detect wireless signals transmitted from the wireless nodes 20A and 20C. The wireless node 20C can detect a wireless signal transmitted from the wireless node 20B. Therefore, the base station 10 can collect the monitoring information summarized in the following Table 2 from the wireless nodes 20A to 20C.

TABLE 2

|  |  | Identification information included in monitoring information | | |
|---|---|---|---|---|
|  |  | 20A | 20B | 20C |
| Identification information regarding wireless nodes collecting monitoring information | 20A |  | ○ | X |
|  | 20B | ○ |  | ○ |
|  | 20C | X | ○ |  |

The control unit 120 is assumed to form the wireless nodes 20A, 20B, and 20C as one group in the foregoing step S304 based on the monitoring information. According to the foregoing Table 2, the wireless node 20B takes all of the other wireless nodes 20 belonging to the same group within the range in which the peripheral monitoring is possible and acquires the monitoring information including the largest number of pieces of identification information, and thus is supposed to be located at the center of the group. Therefore, the control unit 120 decides the wireless node 20B as the representative node 20.

The process of deciding the representative node 20 by the base station 10 in step S306 has been described above.

Subsequently, in step S308, the base station 10 notifies the wireless nodes 20 of the decision result. Specifically, the control unit 120 notifies each wireless node 20 of the decision result of the representative node 20 through the wireless communication unit 110 so that the representative node 20 responds with the ACK response and the wireless nodes 20 other than the representative node 20 do not respond with the ACK response.

The example of the flow of the representative node deciding process performed in the base station 10 has been described above. The base station 10 may perform this process repeatedly at a predetermined time interval and update the group and the representative node 20. The base station 10 may update the group and the representative node 20 at a timing according to necessity such as a timing at which monitoring information different from the previous received monitoring information is received.

<4. Application Example>

The technology according to the disclosure can be applied to various products. For example, the wireless communication device 20 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the wireless communication device 20 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the wireless communication device 20 may be wireless communication modules mounted in such terminals (for example, integrated circuit modules configured by one die).

On the other hand, for example, the communication control device 10 may be realized as a wireless LAN access point (also referred to as a wireless base station) which has a router function or does not have a router function. The communication control device 10 may be realized as a mobile wireless LAN router. The communication control device 10 may also be a wireless communication module (for example, an integrated circuit module configured with one die) mounted on the device.

4.1. First Application Example

FIG. 10 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 10. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 10 via power supply lines partially indicated by dashed lines in the drawing. The auxiliary controller 919 causes, for example, required minimum functions of the smartphone 900 to be operated in a sleep mode.

The smartphone 900 shown in FIG. 10 can operate as the wireless communication device 20. In this case, for example, the wireless communication unit 210, the control unit 220, and the storage unit 230 described with reference to FIG. 3 may be mounted in the wireless communication interface 913. At least some of the functions may be mounted on the processor 901 or the auxiliary controller 919. Thus, the smartphone 900 can serve to decide the representative node in the base station 10 by transmitting the monitoring information to the base station 10, and thus it is possible to realize the more efficient multicast transmission in the entire wireless communication system 1.

Note that the smartphone 900 may operate as a wireless access point (software AP) as the processor 901 executes the function of an access point at an application level. In addition, the wireless communication interface 913 may have the function of a wireless access point.

<4.2. Second Application Example>

FIG. 11 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to a car-mounted network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 11. In this case, the antenna switch 934 may be omitted from the configuration of the car navigation device 920.

The battery 938 supplies electric power to each of the blocks of the car navigation device 920 shown in FIG. 11 via power supply lines partially indicated by dashed lines in the drawing. In addition, the battery 938 accumulates electric power supplied from the vehicle.

The car navigation device 920 shown in FIG. 11 can operate as the wireless communication device 20. In this case, for example, the wireless communication unit 210, the control unit 220, and the storage unit 230 described with reference to FIG. 3 may be mounted in the wireless communication interface 933. At least some of the functions may be mounted on the processor 921. Thus, the car navigation device 920 can serve to decide the representative node in the base station 10 by transmitting the monitoring information to the base station 10, and thus it is possible to realize the more efficient multicast transmission in the entire wireless communication system 1.

The wireless communication interface 933 may operate as the above-described communication control device 10 to supply wireless connection to a terminal owned by a user boarding a vehicle. At this time, for example, the wireless communication interface 933 decides the representative node based on the monitoring information collected from the terminal owned by the user, and thus it is possible to improve the probability of success of the multicast transmission more efficiently.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

<4.3. Third Application Example>

FIG. 12 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

The wireless access point 950 shown in FIG. 12 can operate as the communication control device 10. In this case, for example, the wireless communication unit 110, the control unit 120, and the storage unit 130 described with reference to FIG. 5 may be mounted in the wireless communication interface 963. At least some of the functions may be mounted on the controller 951. Thus, the wireless access point 950 decides the representative node based on the monitoring information collected from a terminal owned by a user, and thus it is possible to improve the probability of success of the multicast transmission more efficiently.

<5. CONCLUSION>

The embodiments of the technology of the present disclosure have been described in detail above with reference to FIGS. 1 to 12. According to the above-described embodiments, in the base station 10 performing the wireless communication with the plurality of wireless nodes 20, the wireless nodes 20 are controlled such that the monitoring information regarding the reception powers when the packets transmitted from the other wireless nodes 20 are received is collected, and the plurality of wireless nodes 20 are grouped based on the collected monitoring information. Thus, the base station 10 can group the aggregation of one or more wireless nodes 20 determined to be present at the mutually close distances as one group.

According to the above-described embodiments, the base station 10 decides one representative node responding with the ACK response to the multicast transmission for each group. Thus, the base station 10 performs the process of retransmitting the multicast packet while reducing the number of wireless nodes 20 responding with the ACK response, and thus it is possible to improve the probability of success of multicast transmission efficiently.

According to the above-described embodiments, the base station 10 groups the wireless nodes 20 present at the mutually close distance based on the identification information included in the monitoring information. In the wireless communication, there is a phenomenon called shadowing in which a correlation is generated in characteristics of radio wave attenuation in a range from a few m (meters) to a few tens of m due to the influences of reflected waves from a blocking object, a nearby building, or the like between transmission and reception. According to shadowing, in the wireless node 20 located at a close distance, the correlation is expected to be generated even in a reception result since the radio wave attenuation with the correlation is added to a packet transmitted from the base station 10. In view of this, the base station 10 groups the wireless nodes 20 located at the close distance and selects the representative node 20 among the wireless nodes 20. Therefore, the reception result in the representative node 20 represents the reception results of the other wireless nodes 20 included in the same group. For example, when the reception of the packet succeeds in the representative node, there is a high probability of the reception of the packet also succeeding in the other wireless nodes 20 included in the same group. Further, when the reception of the packet fails in the representative node, there is a high probability of the reception of the packet also failing in the other wireless nodes 20 included in the same group. Therefore, it is possible to prevent the packet from being retransmitted to the wireless node 20 that has succeeded in receiving the packet or prevent the packet from not being retransmitted to the wireless node 20 that has failed to receive the packet, and thus it is possible to improve the probability of success of the multicast transmission efficiently.

It should be understood by those skilled in the art that various modifications, combinations, sub-combinations and alterations may occur depending on design requirements and other factors insofar as they are within the scope of the appended claims or the equivalents thereof.

For example, in the foregoing embodiments, the case in which the base station 10 decides one representative node 20 has been described, but an embodiment of the present technology is not limited to this example. For example, the base station 10 may decide two or more representative nodes 20. For example, the base station 10 may decide the wireless node 20 located at the remotest distance and the wireless node 20 located at the closest distance from the base station 10 in the group as the representative nodes. The base station 10 retransmits a packet until success in reception of both of the wireless nodes is confirmed, and thus it is possible to improve the probability of success of the multicast transmission.

The series of control processes carried out by each apparatus described in the present specification may be realized by software, hardware, or a combination of software and hardware. Programs that compose such software may be stored in advance for example on a storage medium (non-transitory medium) provided inside or outside each of the apparatus. As one example, during execution, such programs are written into RAM (Random Access Memory) and executed by a processor such as a CPU.

Note that it is not necessary for the processing described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication control device including:

a wireless communication unit configured to perform wireless communication with a plurality of wireless terminals; and a control unit configured to control the wireless terminals through the wireless communication unit such that monitoring information regarding reception powers when packets transmitted from other wireless terminals are received is collected and to group the plurality of wireless terminals based on the collected monitoring information.

(2)

The communication control device according to (1), wherein the control unit decides one representative terminal responding with an acknowledgement response to multicast transmission by the wireless communication unit for each group.

(3)

The communication control device according to (1) or (2), wherein the monitoring information includes identification information regarding the other wireless terminals transmitting packets of which the reception power is greater than a monitoring threshold value.

(4)

The communication control device according to any one of (1) to (3), wherein the control unit groups the wireless terminals present at mutually close distances based on the identification information regarding the other wireless terminals included in the monitoring information.

(5)

The communication control device according to any one of (1) to (4), wherein the control unit performs the grouping repeatedly using the monitoring information which is newly collected.

(6)

The communication control device according to any one of (1) to (5), wherein the wireless communication unit receives the monitoring information collected by the wireless terminal from the wireless terminal.

(7)

The communication control device according to (6) depending from (2), wherein the control unit decides, as the representative terminal, one of the wireless terminals of which the reception powers when the wireless communication unit receives the packets including the monitoring information are highest, lowest, and average among one or more of the wireless terminals belonging to the same group.

(8)

The communication control device according to (2) or any one of (3) to (6) depending from (2), wherein the control unit decides, as the representative terminal, the wireless terminal which is indicated by the identification information included in the monitoring information and is located at a center of one or more of the wireless terminals belonging to the same group.

(9)

A wireless communication device including:
a wireless communication unit configured to perform wireless communication with a base station; and
a control unit configured to control the wireless communication unit so that monitoring information regarding a reception power when the wireless communication unit receives a packet transmitted from another wireless communication device is transmitted to the base station.

(10)

The wireless communication device according to (9), wherein the monitoring information is stored in at least one of a Media Access Control (MAC) header and a payload.

(11)

The wireless communication device according to (10), wherein the control unit stores the monitoring information in a connection request packet used to establish wireless connection with the base station to transmit the monitoring information.

(12)

The wireless communication device according to (10), wherein the control unit stores the monitoring information in an acknowledge response packet to reception from the base station to transmit the monitoring information.

(13)

The wireless communication device according to (10), wherein the control unit stores the monitoring information in a packet dedicated to transmission of the monitoring information to the base station to transmit the monitoring information periodically or in response to a request from the base station.

(14)

The wireless communication device according to any one of (9) to (13), wherein the control unit collects, as the monitoring information, identification information regarding another wireless communication device which is a transmission source of a packet of which the reception power is greater than a monitoring threshold value and of which a destination is not the wireless communication device.

(15)

The wireless communication device according to (14), wherein the monitoring threshold value is a value different from a reception threshold value for receiving a packet of which a destination is the wireless communication device.

(16)

The wireless communication device according to (14) or (15), wherein the monitoring threshold value is set by a notification received by the wireless communication unit from the base station.

(17)

The wireless communication device according to any one of (9) to (16), wherein the control unit collects the monitoring information when no packet is being transmitted to and received from the base station.

(18)

The wireless communication device according to any one of (9) to (16), wherein the control unit collects the monitoring information based on a notification received by the wireless communication unit from the base station.

(19)

A communication control method in a communication control device performing wireless communication with a plurality of wireless terminals, the communication control method including:
controlling the wireless terminals such that monitoring information regarding reception powers when packets transmitted from other wireless terminals are received is collected and grouping the plurality of wireless terminals based on the collected monitoring information.

(20)

A wireless communication method in a wireless communication device performing wireless communication with a base station, the wireless communication method including:
controlling the wireless communication device so that monitoring information regarding a reception power when the wireless communication device receives a packet transmitted from another wireless communication device is transmitted to the base station.

(21)

A system comprising: circuitry configured to receive monitoring information from a plurality of wireless terminals, the monitoring information indicating reception powers at each of the plurality of wireless terminals in a case that packets transmitted from other of the plurality of wireless terminals are received at each of the plurality of wireless terminals; and determine a representative wireless terminal from the plurality of wireless terminals based on the collected monitoring information.

(22)

The system of (21), wherein the circuitry is configured to identify a group of the plurality of wireless terminals based on the monitoring information, and the determined representative wireless terminal is representative of the group of the plurality of wireless terminals.

(23)

The system of (22), wherein the representative wireless terminal is identified as a wireless terminal that responds with an acknowledgement response to a multicast transmission for the group of the plurality of wireless terminals.

(24)
The system of any of (21) to (23), wherein the monitoring information includes identification information regarding the other of the plurality of wireless terminals transmitting packets of which the reception power is greater than a monitoring threshold value.

(25)
The system of any of (22) to (24), wherein the circuitry is configured to identify the group of wireless terminals according to a distance between the wireless terminals based on the identification information regarding the other wireless terminals included in the monitoring information.

(26)
The system of any of (22) to (25), wherein the circuitry is configured to identify the group of the plurality of wireless terminals based on newly collected monitoring information.

(27)
The system of any of (21) to (26), wherein the circuitry is configured to receive the monitoring information collected by the plurality of wireless terminals from each of the plurality of wireless terminals.

(28)
The system of any of (22) to (27), wherein the circuitry is configured to determine, as the representative wireless terminal, a wireless terminal of which the reception power is highest, lowest, and average among the group of the plurality of wireless communication terminals based on the monitoring information.

(29)
The system of any of (22) to (28), wherein the circuitry is configured to determine, as the representative wireless terminal, a wireless terminal which is indicated by the identification information included in the monitoring information and is located at a center of the group of the plurality of wireless communication terminals.

(30)
An electronic device comprising: circuitry configured to perform wireless communication with a base station; and control transmission of monitoring information to the base station regarding a reception power in a case that a packet transmitted from a wireless communication device is transmitted to the base station and received at the electronic device.

(31)
The electronic device of (30), wherein the monitoring information is stored in at least one of a Media Access Control (MAC) header and a payload.

(32)
The electronic device of (31), wherein the circuitry is configured to transmit the monitoring information in a connection request packet used to establish a wireless connection with the base station.

(33)
The electronic device of any of (31) to (32), wherein the circuitry is configured to transmit the monitoring information in an acknowledge response packet transmitted in response to reception of data from the base station.

(34)
The electronic device of any of (31) to (33), wherein the circuitry is configured to transmit, periodically or in response to a request from the base station, the monitoring information in a packet dedicated for transmission of the monitoring information to the base station.

(35)
The electronic device of any of (30) to (34), wherein the circuitry is configured to collect, as the monitoring information, identification information regarding a wireless communication device which is a transmission source of a packet of which the reception power is greater than a monitoring threshold value and of which a destination is not the electronic device.

(36)
The electronic device of (35), wherein the monitoring threshold value is a value different from a reception threshold value for receiving a packet of which a destination is the electronic device.

(37)
The electronic device of any of (35) to (36), wherein the monitoring threshold value is set by a notification received by the electronic device from the base station.

(38)
The electronic device of any of (30) to (37), wherein the circuitry is configured to collect the monitoring information in a case that no packet is being transmitted to or received from the base station.

(39)
The electronic device of any of (30) to (38), wherein the circuitry is configured to collect the monitoring information based on a notification received from the base station.

(40)
A method comprising: receiving monitoring information from a plurality of wireless terminals, the monitoring information indicating reception powers at each of the plurality of wireless terminals in a case that packets transmitted from other of the plurality of wireless terminals are received at each of the plurality of wireless terminals; and determining a representative wireless terminal from the plurality of wireless terminals based on the collected monitoring information.

(41)
A method performed by an electronic device, the method comprising: controlling transmission of monitoring information to a base station regarding a reception power in a case that a packet transmitted from a wireless communication device is transmitted to the base station and received at the electronic device.

REFERENCE SIGNS LIST 1 wireless communication system
10 base station
110 wireless communication unit
120 control unit
130 storage unit
20 wireless node
210 wireless communication unit
220 control unit
230 storage unit

The invention claimed is:
1. A system comprising:
circuitry configured to
receive monitoring information from a plurality of wireless terminals, the monitoring information indicating reception powers at each of the plurality of wireless terminals in a case that packets transmitted from other of the plurality of wireless terminals are received at each of the plurality of wireless terminals; and
determine a representative wireless terminal from the plurality of wireless terminals based on the collected monitoring information, wherein
the monitoring information includes identification information regarding the other of the plurality of wireless terminals transmitting packets of which the reception power is greater than a monitoring threshold value.

2. The system of claim 1, wherein
the circuitry is configured to identify a group of the plurality of wireless terminals based on the monitoring information, and
the determined representative wireless terminal is representative of the group of the plurality of wireless terminals.

3. The system of claim 2, wherein
the representative wireless terminal is identified as a wireless terminal that responds with an acknowledgement response to a multicast transmission for the group of the plurality of wireless terminals.

4. The system of claim 2, wherein
the circuitry is configured to identify the group of the plurality of wireless terminals based on newly collected monitoring information.

5. The system of claim 2, wherein
the circuitry is configured to determine, as the representative wireless terminal, a wireless terminal of which the reception power is highest, lowest, and average among the group of the plurality of wireless communication terminals based on the monitoring information.

6. The system of claim 2, wherein
the circuitry is configured to determine, as the representative wireless terminal, a wireless terminal which is indicated by the identification information included in the monitoring information and is located at a center of the group of the plurality of wireless communication terminals.

7. The system of claim 1, wherein
the circuitry is configured to receive the monitoring information collected by the plurality of wireless terminals from each of the plurality of wireless terminals.

8. A system comprising:
circuitry configured to
receive monitoring information from a plurality of wireless terminals, the monitoring information indicating reception powers at each of the plurality of wireless terminals in a case that packets transmitted from other of the plurality of wireless terminals are received at each of the plurality of wireless terminals;
identify a group of wireless terminals according to a distance between the wireless terminals based on the identification information regarding the other wireless terminals included in the monitoring information; and
determine a representative wireless terminal for the group from the plurality of wireless terminals based on the collected monitoring information.

9. An electronic device comprising:
circuitry configured to
perform wireless communication with a base station; and
control transmission of monitoring information to the base station regarding a reception power in a case that a packet transmitted from a wireless communication device is transmitted to the base station and received at the electronic device, wherein
the circuitry is configured to collect, as the monitoring information, identification information regarding a wireless communication device which is a transmission source of a packet of which the reception power is greater than a monitoring threshold value and of which a destination is not the electronic device.

10. The electronic device of claim 9, wherein
the monitoring threshold value is a value different from a reception threshold value for receiving a packet of which a destination is the electronic device.

11. The electronic device of claim 9, wherein
the monitoring threshold value is set by a notification received by the electronic device from the base station.

* * * * *